United States Patent [19]

Halter

[11] 4,079,872

[45] Mar. 21, 1978

[54] TOOL BOXES FOR BICYCLES

[76] Inventor: David E. Halter, 18 Pond St., Marblehead, Mass. 01945

[21] Appl. No.: 678,362

[22] Filed: Apr. 19, 1976

[51] Int. Cl.² ............................................... B62J 9/00
[52] U.S. Cl. ........................................ 224/31; 224/35; 70/233
[58] Field of Search ...................... 224/35, 30 R, 32 R, 224/39 R; 70/63, 233; 206/442; 220/4 B, 4 E; 248/311.1, 311.3, 312, 313; 24/16 R, 17 A, 20 R

[56] References Cited

U.S. PATENT DOCUMENTS

| 570,923 | 11/1896 | Goodspeed | 224/35 |
| 585,448 | 6/1897 | Quackenboss | 224/35 |
| 604,988 | 5/1898 | Knopping | 224/35 |

FOREIGN PATENT DOCUMENTS

| 465,268 | 4/1914 | France | 224/35 |
| 25,159 | 7/1908 | Sweden | 206/442 |

Primary Examiner—Trygve M. Blix
Assistant Examiner—Jerold M. Forsberg
Attorney, Agent, or Firm—Maurice R. Boiteau

[57] ABSTRACT

There is disclosed in the present application a tool box or kit assembly intended to be secured by means of a lock to a bicycle frame to prevent its theft or loss. The assembly includes a box and an embracing metal strap which secures the box to the bicycle frame and may additionally be formed to secure a tire pump to the frame so that it cannot easily be removed.

2 Claims, 8 Drawing Figures

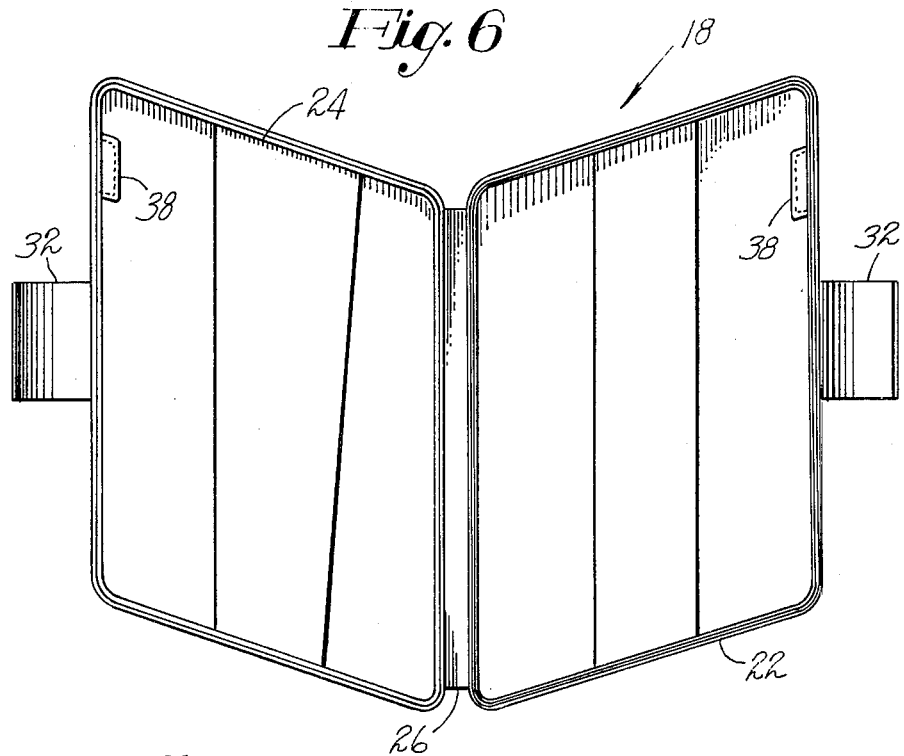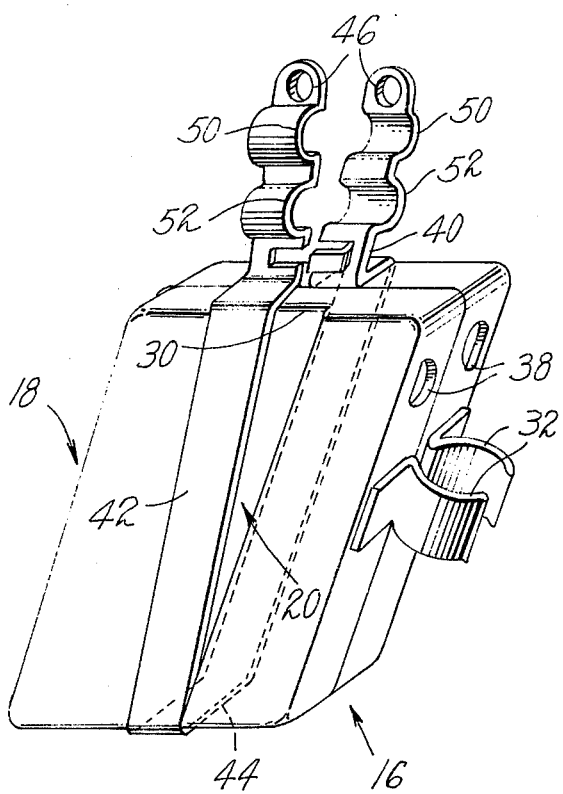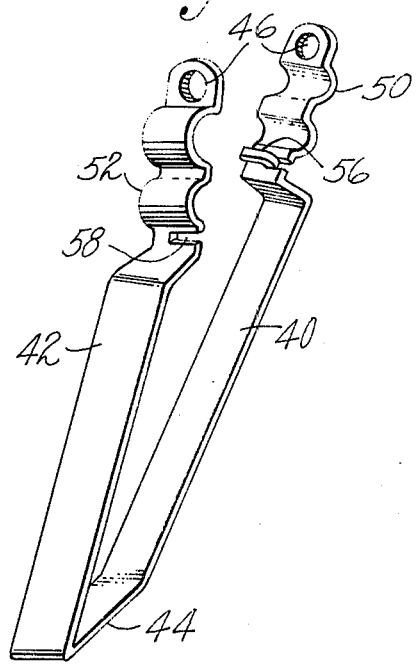

TOOL BOXES FOR BICYCLES

The present invention relates generally to improvements in containers for tools to be carried on bicycles and more particularly to such containers which may be locked shut and to the frame of the bicycle to prevent the theft of the tools.

The advent of long distance cycling as a polular sport, frequently practiced in rural areas away from bicycle repair shops, has made the availability of tools for emergency repairs especially valuable. However, boxes for carrying tools and tool kits such as those mounted on the backs of bicycle seats have been particularly vulnerable to theft so that the tools have not been available when required. Another useful item for touring cyclists is a hand pump for the inflation of soft tires. Such pumps which are usually clipped to the bicycle frame between a pair of depending projections are readily removed by theives, accordingly suffer the same fate as the tools and are also unavailable when needed.

It is accordingly an object of the present invention to insure the security of tools required for emergency repairs and adjustments to bicycles, against unauthorized removal or theft from the bicycle.

Another object is to provide for the storage of a set of tools on a bicycle in such a way that the tools are both prevented from making objectionable noises and also positioned so as not to interfere with the normal operation of the bicycle.

Still another object is to permit the retention of such accessories as an emergency tire inflation pump and the locking of a bicycle with a single lock which also secures a tool kit to the bicycle frame.

The foregoing objects are achieved in accordance with a feature of the invention by a tool box or kit suspendable below the horizontal tube of a conventional bicycle frame and formed with a pair of integral semi-circular clips which encircle the generally vertical seat post tube to prevent movement of the case either along the length of the horizontal bar or in a plane perpendicular to it. Thus, the tool kit is maintained in a rearward position and accordingly does not interfere with the leg movement of the cyclist.

According to another feature of the invention, the tool box is secured to the bicycle frame by means of an encircling metallic belt or strap which enters appropriate grooves in the box to prevent movement between the box and the belt. For securing the box to the frame, the belt is curved at its free ends to surround the horizontal tube of the bicycle frame and also an emergency pump suspended below the horizontal tube.

The foregoing objects and features together with numerous advantages of the present invention will be better understood from the following detailed description of an illustrative embodiment taken in connection with the accompanying drawings in which:

FIG. 6 is a view of the tool box of the previous figures but shown open so that the interior of the box is seen;

FIG. 7 is a view in perspective showing the mode of removal of the encircling strap from the box; and FIG. 8 is a detail view in perspective depicting the securing strap after removal from the tool box.

Figure 1:
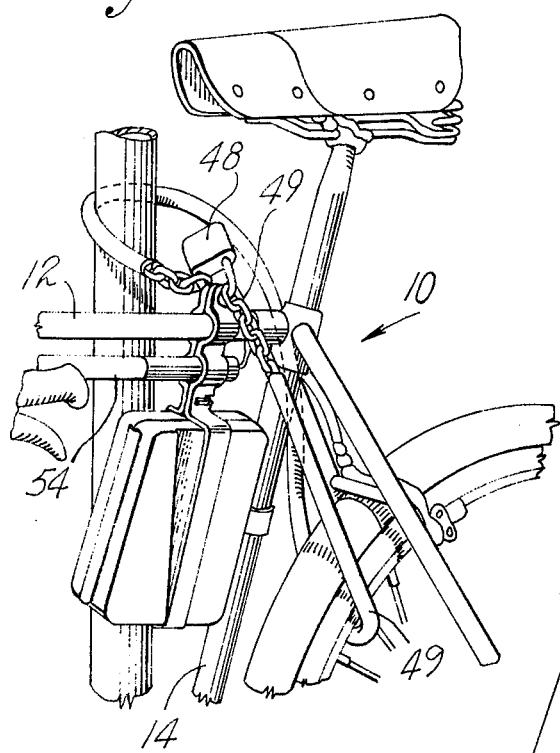
FIG. 1 is a view in perspective showing a portion of a bicycle with a tool box assembly according to the present invention secured to the bicycle frame.
Figure 2:
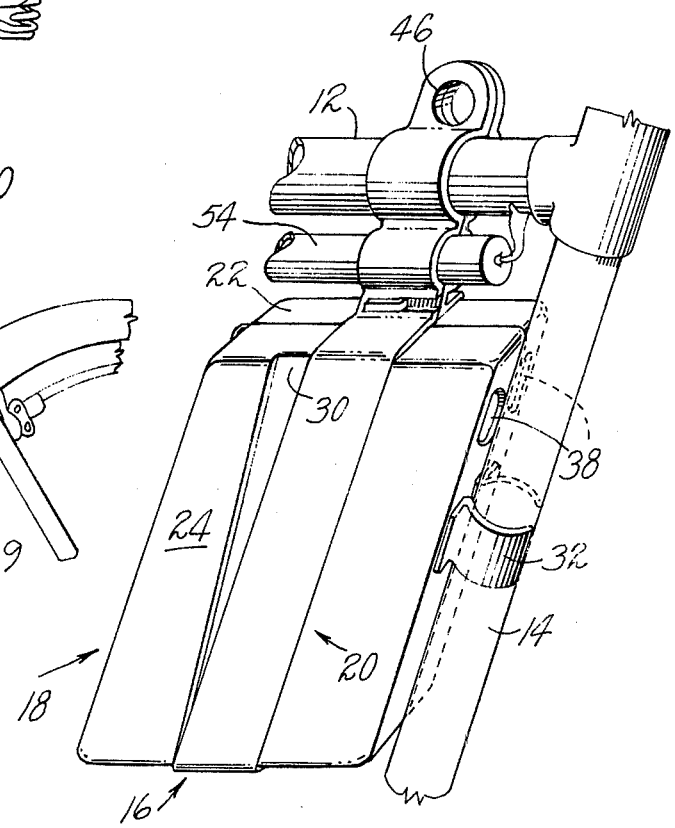
FIG. 2 is a view similar to FIG. 1 but showing a more limited area of the bicycle frame and the tool box assembly on a greater and more detailed scale.

Turning now to the drawings, particularly FIGS. 1 and 2, there is shown a tool box assembly according to the present invention secured to a bicycle frame indicated generally at 10 and including a horizontal tube 12 and a vertical or seat post tube 14. The assembly which is indicated generally at 16 comprises a tool box 18 and a securing metal belt respectively indicated generally at 18 and 20.

Figure 5:
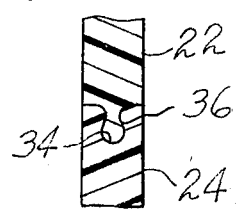
FIG. 5 is a detail sectional view taken along the line V—V of FIG. 4 and showing an edge seal between halves of the tool box.

The tool box 18 as also seen in FIGS. 3 to 7 includes right and left halves 22 and 24 respectively interconnected by an integral hinge 26. The box 18 may be made of metal but is preferably molded of a synthetic plastic material such as ABS (Acrilonitrile Butadiene Styrene), high density polyethylene, high impact polystyrene or polypropylene and its copolymers. An integral plastic molding which is what is depicted in the drawings has the inherent advantage of economy of manufacture, offers protection against premature denting and corrosion and importantly tends to deaden appreciably any objectionable sound emitted by rattling tools contained in the box. The half 22 is formed with a shallow groove 28 of generally uniform width to receive the belt 20 while the half 24 is formed with a groove 30 which tapers from a width equal to that of the groove 28 at its base to a greater width at the top in order to facilitate removal of the strap 20 from its encircling relationship around the box as will later be seen. The box 18 is also formed with a pair of opposed generally semi-circular clips 32, one on each of the halves 22 and 24, for surrounding the seat post tube 14 to retain the tool box assembly against movement along the length of the horizontal tube 12 or in a plane perpendicular to it. As seen in FIG. 5, the half 24 is rabetted at 34 to permit the entry of a tongue 36 which provides a seal to prevent water from reaching the tools contained in the box. In addition, each of the halves 22 and 24 is formed with a thumb-engageable indentation 38 for ease in opening the box.

The belt 20 which is also seen in FIG. 8 is of a width to fit the groove 28 and the lower end of the groove 30, and is in the form of a pair of legs 40 and 42, right and left respectively, upstanding in spaced relation from a base portion 44. The legs 40 and 42 and the base 44 are so shaped that when the distal end portions of the legs are brought together while the belt 20 is around the box 18 lying in the grooves 28 and 30, the box may neither be opened nor slipped out of the belt 20 without spreading the distal ends of the legs 40 and 42 apart. Each of the legs 40 and 42 near its free end is perforated as shown as 46 to receive a padlock 48. As seen in FIG. 1, the same padlock 48 which secures the tool box to the bicycle frame may also secure the rear wheel and the frame against theft by passing a stout chain 49 through the wheel around a relatively immovable object such as a tree or post and securing the ends of the chain together by the padlock.

Figure 3:
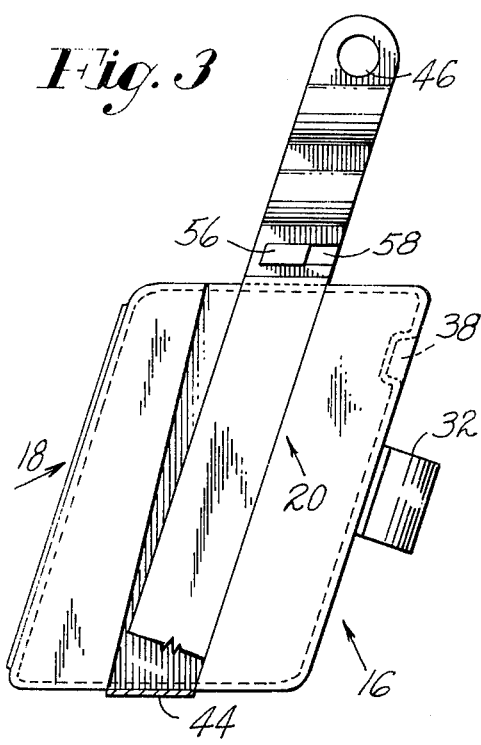
FIG. 3 is a view in side elevation of the tool box assembly shown separated from the bicycle frame.
Figure 4:
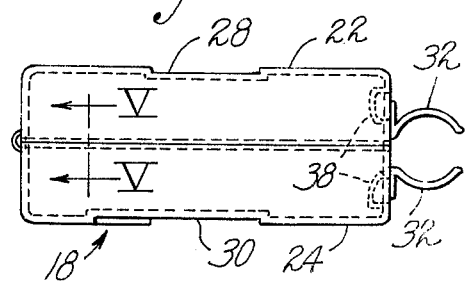
FIG. 4 is a plan view of the box depicted in FIG. 3 but shown without the encircling strap.

Between the portion of the legs 40 and 42 which surround the box 18 and the perforation 46, each leg is formed with a pair of semi-circular bends spaced apart along the length of the leg. Thus, each leg is formed with a bend 50 which together encircle the tube 12 when the free ends of the legs are brought together and a bend 52 which together encircle a pump 54 mounted in parallel relation beneath the tube 12. In addition, the leg 40 is formed with an integral hook 56 positioned to enter a notch 58 cut in the leg 42. After the padlock has been removed from the perforations 46, the additional width of the groove 30 near the top of the box permits the leg 42 to be moved laterally to the left as seen in FIGS. 2, 3 and 7 so that the notch 58 may be disengaged from the hook 56. This allows the legs to be spread apart and the strap 20 removed from the box 18. As an alternative to the tapered groove 30, the groove 28 may be made considerably deeper in the half 22 and the surface of the half 24 kept flat by eliminating the groove 30 altogether.

Having thus disclosed my invention, what I claim as new and desire to secure by Letters Patent of the U.S. is:

1. A tool box assembly detachably connectible to a bicycle frame having a pump disposed in parallel relation to a tube of the frame, comprising a box molded with an integral body and a hinged cover, a metallic belt connectible to the bicycle frame and formed to encircle the body and cover, the belt being relatively rigid in a longitudinal plane of the bicycle but sufficiently flexible when separated from the bicycle frame to permit removal of the box from the belt, means including an integrally molded groove in the box into which the belt fits for preventing removal of the box from the belt while the belt is secured to the bicycle frame, and means for locking the belt to the frame including end portions curved to surround the tube when the belt is in encircling relationship with the box.

2. A tool box assembly according to claim 1 further characterized in that the belt is formed with a generally U-shaped mid-portion for encircling the box and that its end portions are additionally curved to embrace the pump when the belt is secured to the frame.

* * * * *